(12) United States Patent
Kim et al.

(10) Patent No.: US 8,131,330 B2
(45) Date of Patent: Mar. 6, 2012

(54) SLIDING TYPE PORTABLE TERMINAL

(75) Inventors: Jae-Wook Kim, Gumi-si (KR);
Jae-Hong Park, Mokpo-si (KR);
Hong-Bum Kim, Seoul (KR);
Kyu-Hwan Lim, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1164 days.

(21) Appl. No.: 11/873,066

(22) Filed: Oct. 16, 2007

(65) Prior Publication Data
US 2008/0146169 A1 Jun. 19, 2008

(30) Foreign Application Priority Data
Dec. 14, 2006 (KR) .......................... 10-2006-127967

(51) Int. Cl.
*H04M 1/00* (2006.01)
(52) U.S. Cl. .................................................. 455/575.4
(58) Field of Classification Search ............... 455/575.4, 455/575.1, 550.1, 90.1–90.3, 575.8
See application file for complete search history.

(56) References Cited

U.S. PATENT DOCUMENTS

| 7,778,663 B2 * | 8/2010 | Bong Doo | 455/556.1 |
| 2006/0088310 A1 | 4/2006 | Jung | |
| 2006/0098119 A1 | 5/2006 | Lee | |
| 2006/0114646 A1 | 6/2006 | Koibuchi et al. | |
| 2006/0231620 A1 | 10/2006 | Kim et al. | |

FOREIGN PATENT DOCUMENTS

| EP | 1 648 145 A1 | 4/2006 |
| KR | 20-2000-0017402 U | 9/2000 |
| KR | 10-2005-0056705 A | 6/2005 |
| KR | 100537699 B1 | 12/2005 |

* cited by examiner

*Primary Examiner* — Eugene Yun
(74) *Attorney, Agent, or Firm* — Jefferson IP Law, LLP (57) ABSTRACT

A sliding type portable terminal is provided. The sliding type portable terminal includes a first housing, a second housing connected with the first housing while facing the first housing and reciprocating on the first housing in a straight direction, and a guide member mounted to the first housing, the guide member being slidably connected to the second housing while surrounding edges of a rear case of the second housing, wherein ends of both sides of the guide member are surrounded by a front case of the second housing. The sliding type portable terminal can be readily reduced in thickness because the guide member mounted to the first housing is slidably connected to the rear case of the second housing while surrounding the rear case of the second housing. Further, a battery mounting hole is formed in the first housing and closed by the guide member at the one face of the first housing, by which the reduction of thickness of the sliding type portable terminal is more efficiently achieved.

20 Claims, 6 Drawing Sheets

SLIDING TYPE PORTABLE TERMINAL

PRIORITY

This application claims the benefit under 35 U.S.C. §119 (a) of a Korean patent application filed in the Korean Industrial Property Office on Dec. 14, 2006 and assigned Serial No. 2006-127967, the entire disclosure of which is hereby incorporated by reference.

BACKGROUND OF THE INVENTION

1. Field of the Invention

The present invention relates to a portable terminal. More particularly, the present invention relates to a sliding type portable terminal in which a pair of housings are connected with each other while facing each other and reciprocately move in a straight direction.

2. Description of the Related Art

Generally, portable terminals may be classified into bar type terminals, flip type terminals and folder type terminals.

A bar type terminal has a single body housing on which data input/output units and transmitter/receiver units are arranged. Thus, a keypad on this terminal, including the data input units of the keypad, is always exposed and thereby likely to be operated erroneously. In addition, because a distance between the transmitter unit and receiver unit must be maintained, there is a limitation in the compactness of the bar type terminals.

A flip type terminal has a body, a flip and a hinge module connecting the body and the flip to each other. In the flip type terminal, the body has data input/output units and transmitter/receiver units arranged thereon and the flip covers the keypad including its data input units, thereby preventing erroneous operation. However, this terminal is also subject to the limitation for compactness because the distance between the transmitter unit and receiver unit must be maintained.

A folder type terminal has a body, a folder, and a hinge module pivotally connecting the body and the folder to each other. The folder type terminal is opened and closed by rotating the folder, thereby preventing the erroneous operation of the keypad in standby mode in which the folder is folded onto the body. Also, the folder is unfolded in the calling mode so as to provide a sufficient distance between the transmitter unit and receiver unit. Thus, the folder type terminal has a beneficial advantage in compactness. For this reason, the folder type terminal has been very popular amongst all types of portable terminals.

Meanwhile, according to design variety for portable terminals, sliding type terminals have been recently commercialized. A sliding type terminal includes a pair of housings, one of which slides on another to open and close the terminal. Sliding type terminals are becoming as popular as the folder type terminals. For convenience in using a sliding type terminal, various devices that provide semi-automatic operation of a sliding type terminal have appeared.

The aforementioned portable terminals have been made to be more compact and lightweight in consideration of their portability. On the other hand, multimedia functions such as the playing of Digital Multimedia Broadcasting (DMB), motion pictures, and the like are currently becoming more popular. Since a larger size screen and display device are necessary for utilizing such multimedia functions, miniaturization of the portable terminal has reached its limits.

Therefore, efforts for reducing the size of the terminal are focusing on reducing the thickness of the terminal. As the result of such efforts, folder type portable terminals having a thickness of less than about 10 mm have successfully been commercialized. Contrary to the bar type and folder type terminals, the sliding type portable terminals have limits regarding the reduction of their thickness. More specifically, sliding type portable terminals typically have a structure that includes a pair of housings which are connected to each other while facing each other to enable the sliding movement of the housings. Such a layered structure used for connecting and sliding the housings of the sliding type portable terminal makes it difficult to reduce the thickness thereof.

SUMMARY OF THE INVENTION

An aspect of the present invention is to address at least the above-mentioned problems and/or disadvantages occurring in the prior art and to provide at least the advantages described below. Accordingly, an aspect of the present invention is to provide a sliding type portable terminal which includes a pair of housings reciprocately moving to open and close while facing each other and permit the reduction of thickness thereof.

In accordance with an aspect of the present invention, a sliding type portable terminal is provided. The portable terminal includes a first housing, a second housing connected with the first housing while facing the first housing and reciprocating on the first housing in a straight direction and a guide member mounted to the first housing, the guide member being slidably connected to the second housing while surrounding edges of a rear case of the second housing, wherein ends of both sides of the guide member are surrounded by a front case of the second housing.

BRIEF DESCRIPTION OF THE DRAWINGS

The above and other aspects, features and advantages of certain embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
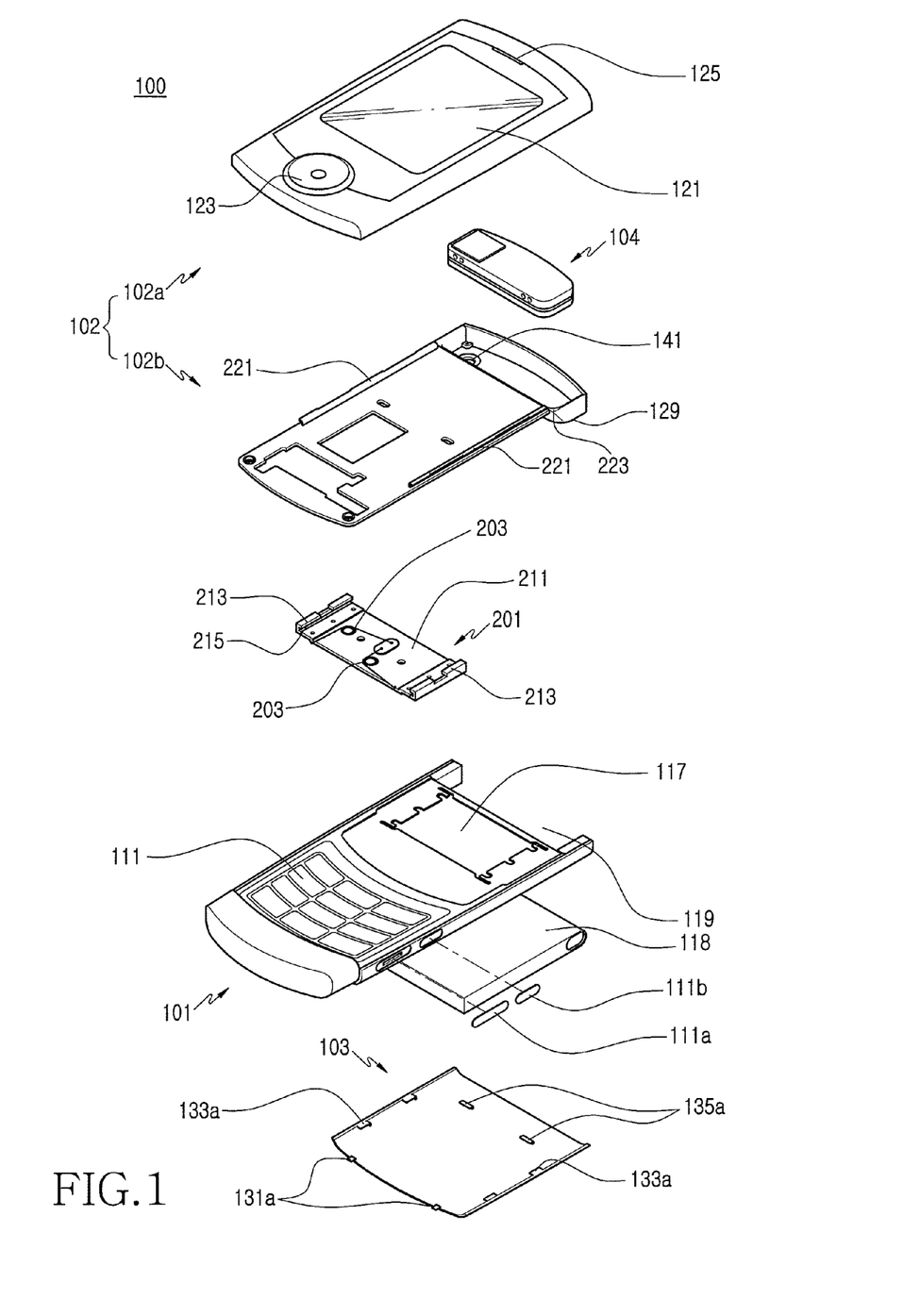
FIG. 1 is an exploded perspective view illustrating a sliding type portable terminal according to an exemplary embodiment of the present invention.

FIG. 1 is an exploded perspective view of a sliding type portable terminal 100 according to an exemplary embodiment of the present invention. As shown in FIG. 1, the sliding type portable terminal 100 includes a first housing 101, a second housing 102 which is connected with the first housing 101 while facing the first housing 101, and a guide member 201 which is mounted to the first housing 101 and slidably connected to a rear case 102b of the second housing 102. The guide member 201 provides a means capable of connecting the second housing 102 with the first housing 101, and at the same time allowing the second housing 102 to reciprocately move in a straight direction.

The first housing 101 has a keypad 111 and a transmitting unit (not shown) arranged on a part of a front face thereof, specifically on a lower portion of the front face. The first housing 101 also mounts a cover member 111a or a button member 111b, etc., on side surfaces thereof. The keypad 111 includes keys for input of numerals, characters, etc.

The terminal 100 may have a camera function, and may mount a memory card or other storage device, capable of storing photographed images, downloaded information files, music/motion picture files, and the like for example. The cover member 111a is a member for opening and closing a hole where the memory card or storage device is inserted. The button member 111b may provide a function of a camera shutter switch or be used for a recording, menu navigation, volume control, and the like for example.

A battery mounting hole 117 and a camera receiving portion 119 are provided above the keypad 111. The battery mounting hole 117 is formed through the first housing 101 passing through the front face and a rear face thereof. The battery mounting hole 117 is closed by the guide member 201 at the front face of the first housing 101 and is opened and closed by a battery cover 103 at the rear face of the first housing 101. The camera receiving portion 119 is formed by opening a part of an upper end of the first housing 101. A part of the camera receiving portion 119 is opened and closed by the battery cover 103. That is, when the battery cover 103 is being mounted to the first housing 101, the battery mounting hole 117 and a part of the camera receiving portion 119 are closed by the battery cover 103 at the same time.

The second housing 102 includes a front case 102a and the rear case 102b, and is connected with the first housing 101 while the rear case 102b faces one face of the first housing 101. The second housing 102 has a display device 121, a functional keypad 123, and a receiving unit 125, which are arranged on a front face of the second housing 102. The functional keypad 123 includes keys for displaying a menu, for searching and selecting a menu item and information, which has been stored and received, for starting/ending a communication and the like.

The rear case 102b is mounted to a rear face of the front case 102a, by which the second housing 102 is achieved. On an upper end of the rear case 102b, there is formed a camera housing 129 extending backward from the second housing 102. There are formed support ribs 221 on an inner face of the rear case 102b.

Each of the support ribs 221 protrudes from an edge portion of the inner face of the rear case 102b of the second housing 102 and has an upper portion bent to the outside of the rear case 102b. The support ribs 221 also extend in the longitudinal direction of the second housing 102 and thus guide the sliding movement of the second housing 102 in cooperation with the guide member 201. The camera housing 129 is received in the camera receiving portion 119 while the second housing 102 is closing the first housing 101.

A camera module 104 including a speaker unit (not shown) is accommodated in the camera housing 129. The camera housing 129 has an opening 141 providing the photographing path of a camera unit (not shown) installed in the camera module 104. The speaker unit is disposed corresponding to the receiving unit 125, and the speaker unit, through the receiving unit 125, outputs the voice of a call counterpart when the user is engaging in a voice call with the call counterpart or sounds played back when the user views multimedia files.

The guide member 201 includes a connecting plate 211 and guide ribs 213. Each of the guide ribs 213 is mounted to a respective one of ends of both sides of the connecting plate 211 and has each of sliding grooves 215 formed on an inner side surface thereof. So, the sliding grooves 215 face each other. The rear case 102b is at each of its ends of both sides engaged with each of the sliding grooves 215 so that the rear case 102b is slidably connected with the guide member 201 through the guide ribs 213.

Figure 2:
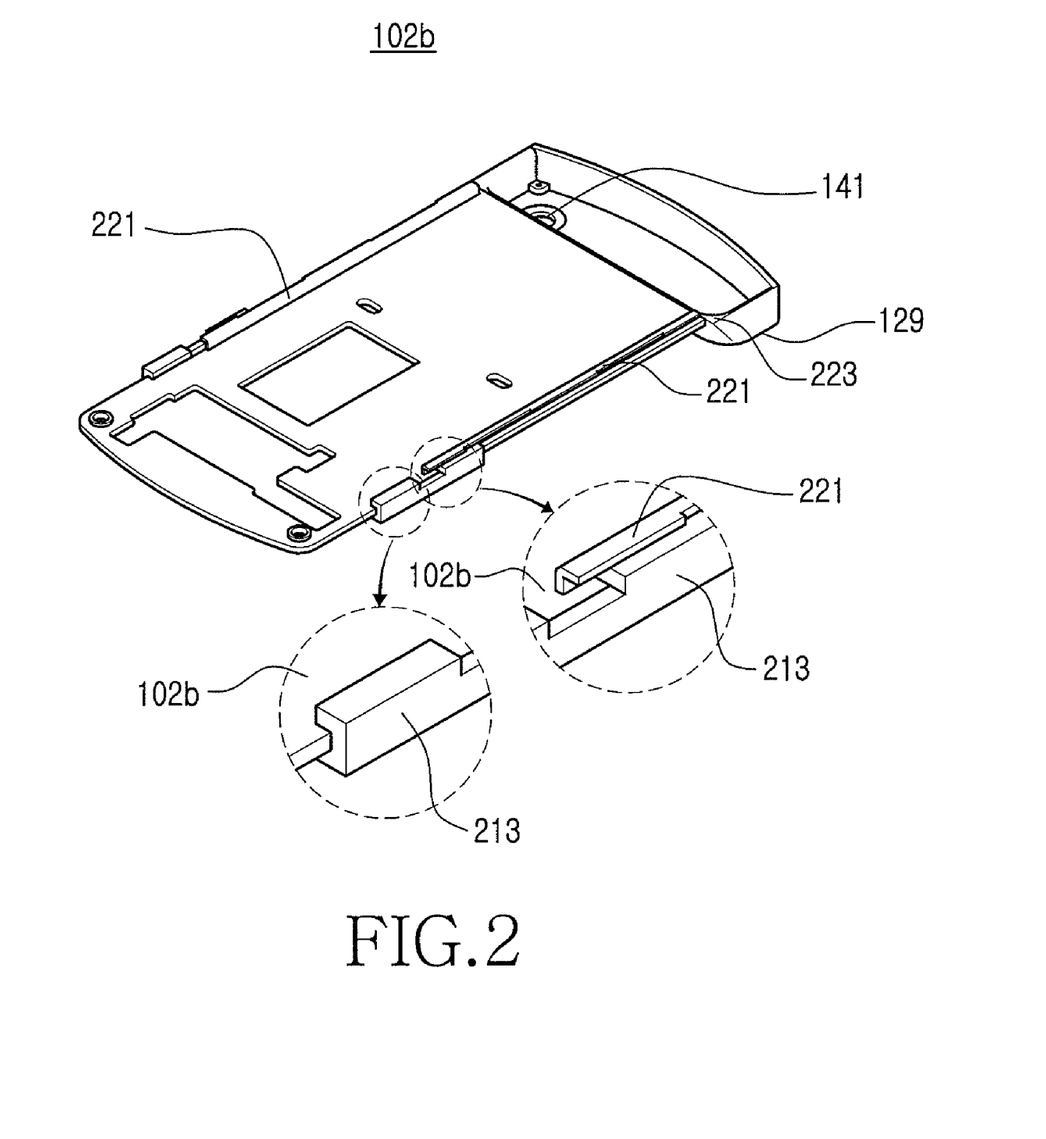
FIG. 2 is a perspective view illustrating a rear case of a second housing of an exemplary portable terminal as shown in FIG. 1, in which a guide member is connected to the rear case of the second housing.
Figure 3:
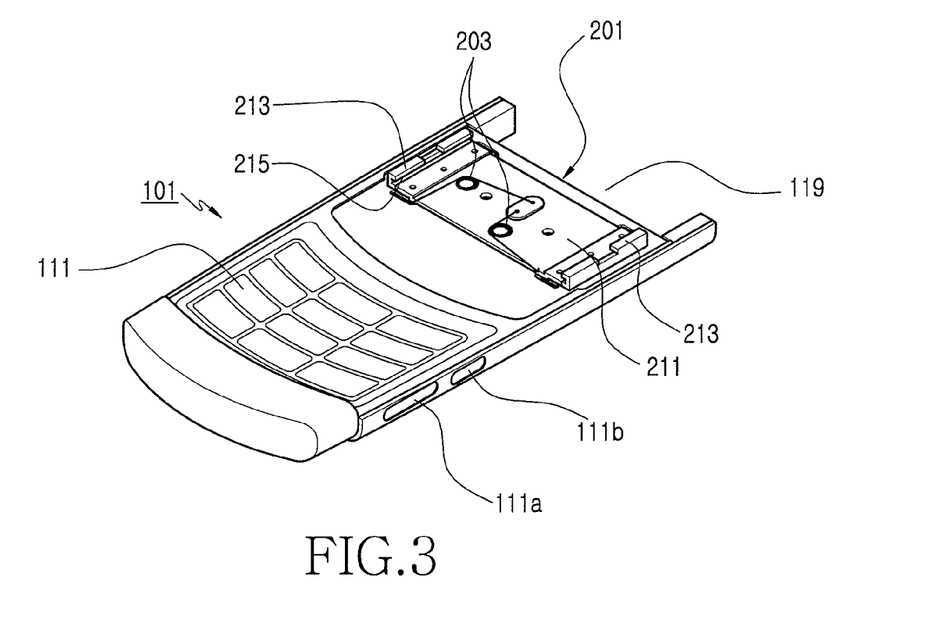
FIG. 3 is a perspective view illustrating a first housing of an exemplary portable terminal shown in FIG. 1, in which a guide member is connected to the first housing of the portable terminal.
Figure 4:
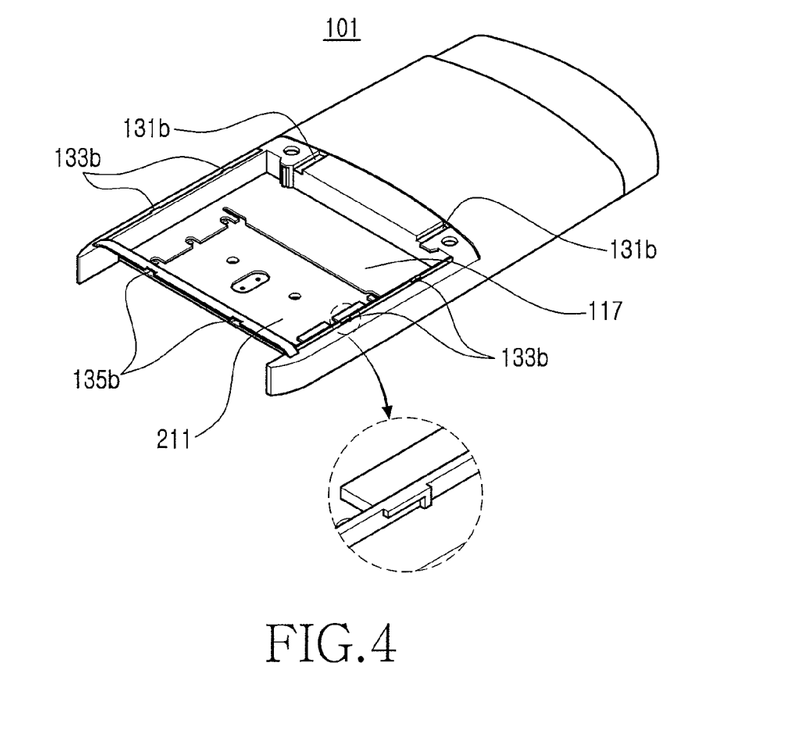
FIG. 4 is a rear perspective view illustrating an exemplary first housing of a portable terminal shown in FIG. 1.

Referring to FIGS. 2 to 4, the guide member 201 is connected with the rear case 102b in such a manner that each of the guide ribs 213 of the guide member 201 surrounds each of edges of both sides of the rear case 102b, so the guide member 201 slides on the second housing 102, specifically on the rear case 102b. Further, the connecting plate 211 of the guide member 201 is mounted to the first housing 101, so that the guide member 201 is mounted to the first housing 101.

Accordingly, the guide member 201 is mounted to the first housing 101 and thus is slidably connected with the rear case 102b, so that the second housing 102 reciprocately moves in the straight direction while facing the first housing 101.

The connecting plate 211 is mounted on the front face of the first housing 101, and thus closes the battery mounting hole 117 at the front face of the first housing 101. Screws may be used to mount the connecting plate 211 on the first housing 101.

Rear case 102b also includes stopper ribs 223, each of which extends from a respective one of both sides of an upper end portion of the rear case 102b to the outside of the rear case 102b. The stopper ribs 223 interfere with the guide ribs 213, thereby limiting the sliding movement of the guide ribs 213. In addition, the guide ribs 213 are, although not shown in drawings, blocked by the front case 102a at a lower end portion of the rear case 102b after the rear case 102b is mounted to the front case 102a.

Accordingly, the guide ribs 213 are blocked by the front case 102a or the stopper ribs 223 of the rear case 102b of the second housing 102 and the movement range of the guide ribs 213 is thus limited, which in turn limits the movement range of the second housing 102 which reciprocately moves in the straight direction.

Namely, when the second housing 102 moves in a direction to open the first housing 101, the guide ribs 213 are blocked by the front case 102a whereby second housing 102 stops. At this time, the keypad 111 arranged in the first housing 101 is completely opened or exposed. Further, when the second housing 102 moves in a direction to close the first housing 101, the guide ribs 213 are blocked by the stopper ribs 223 whereby the second housing 102 stops and the keypad 111 is completely closed or covered.

On the other hand, as shown in FIG. 2, each of the support ribs 221 formed in the rear case 102b surrounds a respective one of the edges of the guide ribs 213 when each of the edges of both sides of the rear case 102b is engaged with each of the sliding grooves 215. Each of the support ribs 221 extends in the longitudinal direction of the second housing 102, and thus supports and guides each of the guide ribs 213 to slide on the second housing 102.

In an exemplary embodiment, the connecting plate 211 of the guide member 201 may be made of metallic materials and the guide ribs 213 of the guide member 201 may be made of synthetic resins. The connecting plate 211 and the guide ribs 213 may be united to form the guide member 201 by using an insert molding. Namely, the connecting plate 211 may be made of the metallic materials so as to ensure the coupling strength when being mounted to the first housing 101, and the guide ribs 213 may be made of the synthetic resins having durability and lubricative property, such as POM (polyoxymethylene), so as to slide smoothly while being engaged with the rear case 102b.

The battery cover 103 is mounted on the rear face of the first housing 101 so that an exterior face thereof accords with the rear face of the first housing 101. Namely, the exterior face of the battery cover 103 appears to be a part of the rear face of the first housing 101 when the battery cover 103 is mounted to the first housing 101.

Referring to FIGS. 1 and 4, the battery cover 103 includes connecting protrusions 131a, hooks 135a and first connecting ribs 133a. The first housing 101 includes connecting grooves 131b, hook recesses 135b, and second connecting ribs 133b.

The connecting protrusions 131a have a shape extending from one end of the battery cover 103 and may be each engaged with each of the connecting grooves 131b formed on the rear face of the first housing 101. When the connecting protrusions 131a are fully engaged with the connecting grooves 131b, the hooks 135a are each received in each of the hook recesses 135b and the first connecting ribs 133a are each engaged with each of the second connecting ribs 133b.

The hooks 135a protrude from an inner face of the battery cover 103, bend, and extend to face with the inner face of the battery cover 103. The hook recesses 135b receiving the hooks 135a are disposed at an upper end portion of the first housing 101 and specifically adjacent to the camera receiving portion 119. As the connecting protrusions 131a are engaged with the connecting grooves 131b, the hooks 135a are each received in each of the hook recesses 135b and face the inner face of the first housing 101. Namely, the end of the first housing 101 is disposed between the hooks 135a and the inner face of the battery cover 103.

At least one pair of the first connecting ribs 133a are each formed on each of inner surfaces of walls of both sides of the battery cover 103. The second connecting ribs 133b are each formed on each of surfaces of both sides of the first housing 101 and thus correspond to the first connecting ribs 133a. As the connecting protrusions 131a are engaged with the connecting grooves 131b, the first connecting ribs 133a are each engaged with each of the second connecting ribs 133b, which thus makes the battery cover 103 to be in close contact with the rear face of the first housing 101 and connected to the first housing 101 so as not to escape from the first housing 101.

When the battery cover 103 is positioned at the rear face of the first housing 101 so that the connecting protrusions are aligned to the connecting grooves 131b, the battery cover 103 comes into close contact with the rear face of the first housing 101. At this time, the hooks 135a are aligned to the hook recesses 135b, and the first connecting ribs 133a are aligned to the second connecting ribs 133b, respectively. When the battery cover 103 is then moved in a direction in which the connecting protrusions are engaged with the connecting grooves, the connecting protrusions 131a are each engaged with each of the connecting grooves 131b and the hooks 135a are each received in each of the hook recesses 135b at the same time, and the first connecting ribs 133a are each engaged with each of the second connecting ribs 133b. As a result, the battery cover 103 comes into close contact with and is secured to the first housing 101.

Meanwhile, the connecting protrusions 131a, the hooks 135a, the first connecting ribs 133a the battery cover 103 and the like may have latch means so as to maintain stably the closely contacted and secured state of the battery cover. Namely, protrusions are each formed on each of ends of the hooks 135a and recesses are formed at the first housing 101. Therefore, the ends of the hooks come to be engaged with the recesses of the first housing 101 when the battery cover is in close contact with and secured to the first housing 101. As a result, the battery cover 103 is prevented from escaping from the first housing 101 regardless of the user's intention when the battery cover 103 is in close contact with and secured to the first housing 101.

Similarly, the first and second connecting ribs 133a and 133b may each have each of protrusions formed therein, which are engaged with each other, or may each have an additional protrusion and recess formed therein, respectively, so that a latch means can be made. Such latch means will be readily understood by those of skill in the art.

Through the configuration described above, the second housing 102 of the terminal 100 is slidably connected to the first housing 101, and a part of the guide member 201 closes the battery hole, thereby reducing some thickness corresponding to the part of the guide member 201. In addition, the configuration enables the terminal to have a slimmed structure which allows a battery pack 118 to be stably mounted thereto and protected therein.

There is also provided an elastic member 203. Therefore, once the user slides the second housing 102 only a part of the entire sliding distance, the second housing 102 can be slid the rest of the way by the elastic force of the elastic member 203.

The elastic member 203 is supported at its one end on the guide member 201 and at its another end in the second housing 102, specifically on the rear case 102b, thereby providing an elastic force acting in a direction to move its both ends away from each other.

The elastic member 203 of this exemplary embodiment employs a torsion spring which includes a coil and free ends extending in a direction away from each other, and thus provides the elastic force acting in a direction to move the free ends away from each other.

A point (hereinafter, referred to as the "closest approaching point") at which both ends of the elastic member 203 approach each other most closely exists within the range in which the second housing 102 reciprocately moves in the straight direction. The elastic force of the elastic member 203 is a driving force acting in a direction to move the second housing to close the first-housing 101 on one side of the closest approaching point, and acting in a direction to move the second housing 102 to open the keypad 111 of the first housing 101 on another side of the closest approaching point.

Namely, the closest approaching point is located between a first position at which the second housing 102 has closed the keypad 111 and a second position at which the second housing 102 has opened the keypad 111. The second housing is provided with the driving force acting in the direction to close the keypad 111 when being between the first position at which the keypad 111 has closed and the closest approaching point, whereas the driving force acting in the direction to open the keypad 111 when being between the second position at which the keypad 111 has opened and the closest approaching point.

Therefore, once the user moves the second housing 102 to go beyond the closest approaching point in order to open the closed keypad 111, then the second housing 102 is moved by the elastic force of the elastic member 203 for the remaining travel. Also, once the user moves the second housing 102 to go beyond the closest approaching point in order to close the opened keypad 111, then the second housing 102 is moved by the elastic force of the elastic member 203 for the remaining travel.

While the elastic member 203 has been described using a torsion spring as an example, it will be understood by those skilled in the art that various other types of elastic members, which provide an elastic force acting in a direction to move both ends away from each other, may be used.

Compression coil springs are another example for the elastic member 203. Also, there are other examples, as shown in FIGS. 9A to 9C, such as, a push rod 301a, a push rod module 301b including at least one pair of push rods 301a formed into a module type and a wire spring 301c having a zigzag shape.

Figure 9A:
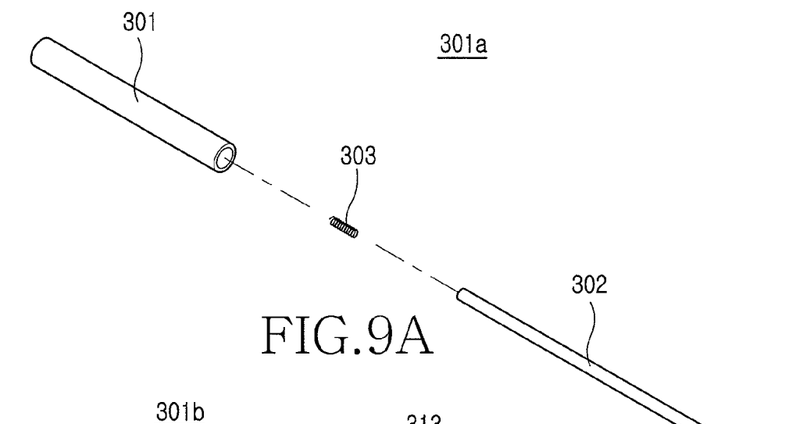
FIG. 9 is a perspective view illustrating different examples of an elastic member capable of being employed in the portable terminal shown in FIG. 1.

As shown in FIG. 9A, the push rod 301a includes a tube 301 receiving a compression coil spring 303 and a support rod 302 which is received in the tube 301 in a manner permitting it to be inserted into and drawn out from the tube 301. The compression coil spring 303 provides an elastic force acting in a direction to draw out the support rod 302 from the tube 301. Therefore, the push rod 301a can provide an elastic force acting in a direction to move an end of the tube 301 and an end of the support rod 302 away from each other.

When the above push rod 301a is supported at the end of the tube 301 on the guide member 201 and at the end of the support rod 302 on the rear case 102b, the push rod 301a acts similar to a torsion spring.

Figure 9B:
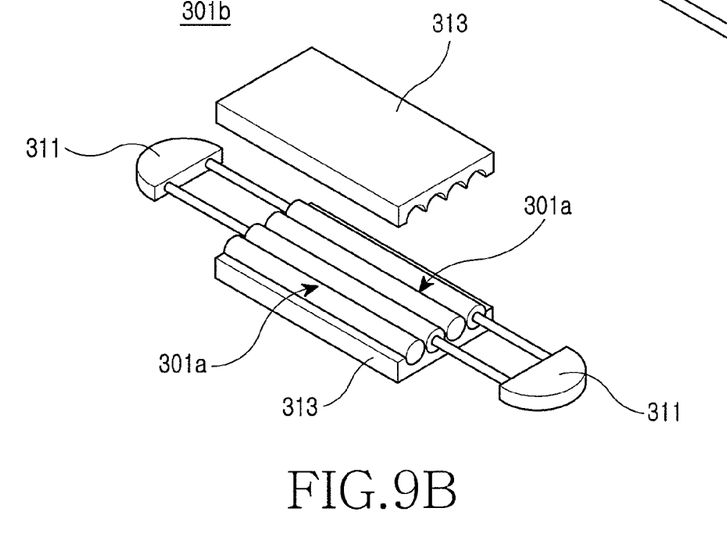
Figure 9C:
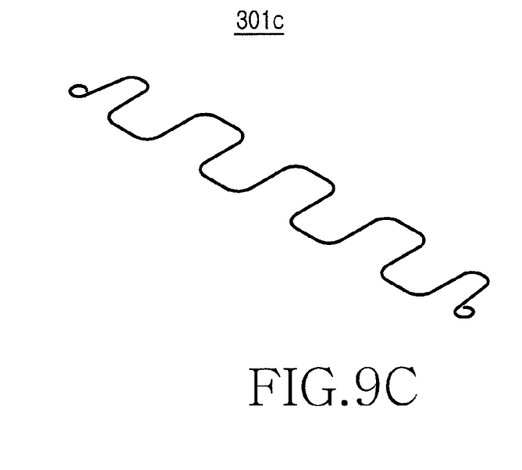

As shown in FIG. 9B, the push rod module 301b includes at least one pair of the push rods 301a fixed in parallel to each other, and provides an elastic force acting to draw out each of the support rods 302 in directions opposite to each other. The push rod module 301b shown in FIG. 9B is an example consists of two pairs of push rods 301a, in which a tube 301 is fixed in a module housing 313 and each of support members 311 connects ends of support rods drawn out in the same direction. When one of the support members 311 is supported on the guide member 201 and the other one of the support members 311 is supported on the rear case 102b, the push rod module 301b acts as the same as the torsion spring.

As shown in FIG. 9C, the wire spring 301c is crooked to have a zigzag shape from one end to the other end. When the one end of the wire spring 301c is supported on the guide member 201 and the other end of the wire spring 301c is supported on the rear case 102b, the wire spring 301c acts similar to the torsion spring.

FIGS. 5 to 8 show appearances of the terminal 100 before and after the keypad 111 is opened.

Figure 5:
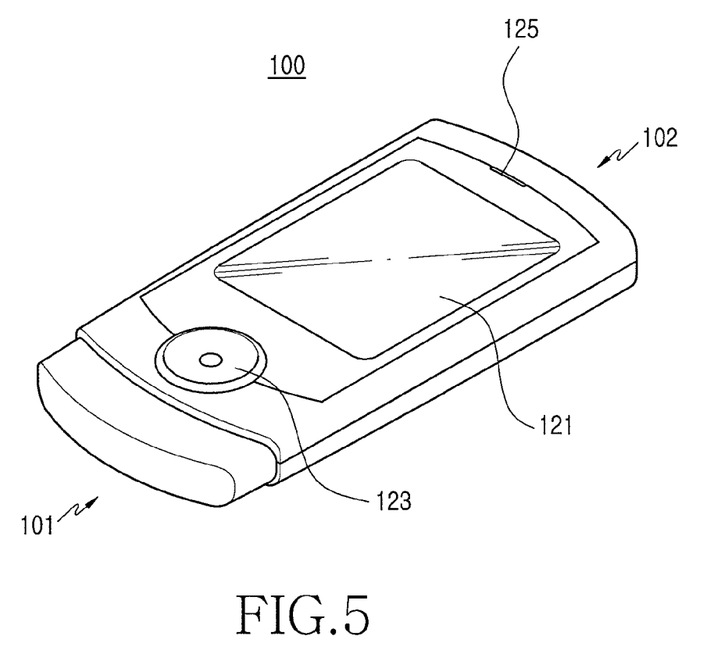
FIG. 5 is an assembled perspective view illustrating an exemplary portable terminal shown in FIG. 1.
Figure 6:
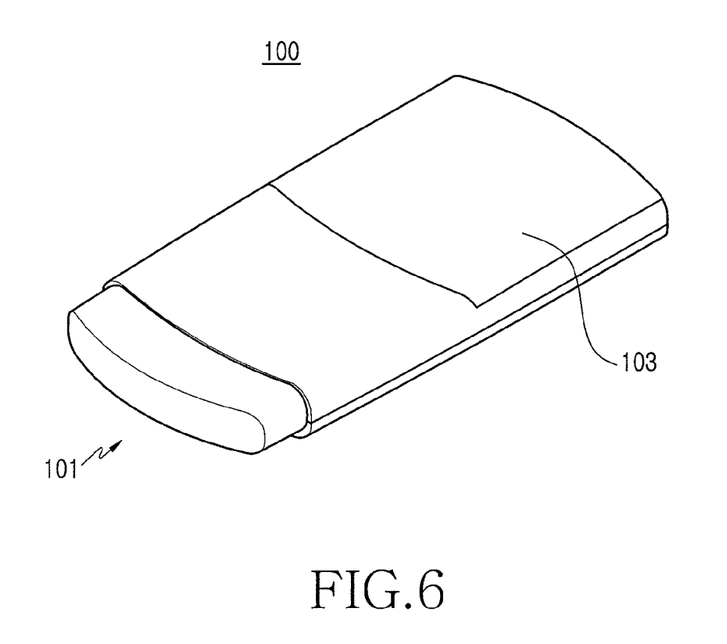
FIG. 6 is a rear perspective view illustrating an exemplary portable terminal shown in FIG. 5.

Referring to FIGS. 5 and 6, when the second housing 102 has closed the keypad 111, the camera housing 129 is accommodated in the camera receiving portion 119 and is thus closed by the battery cover 103. In the state that the keypad 111 is closed, the user can activate multimedia functions of the terminal 100 through the button member 111b in the side surface of the terminal or the functional keypad 123 in the second housing 102.

When the keypad 111 is being closed, the elastic member 203 provides the elastic force to move the second housing 102 toward the lower side of the first housing 101 while being in the state that both ends thereof are far from each other. At the same time, the guide ribs 213 are each blocked by each of the stopper ribs 223 of the rear case 102b, thereby preventing the second housing 102 from moving downward any more beyond the first housing 101. Therefore, the second housing 102 can be maintained in the stable stationary state while closing the keypad 111.

Figure 7:
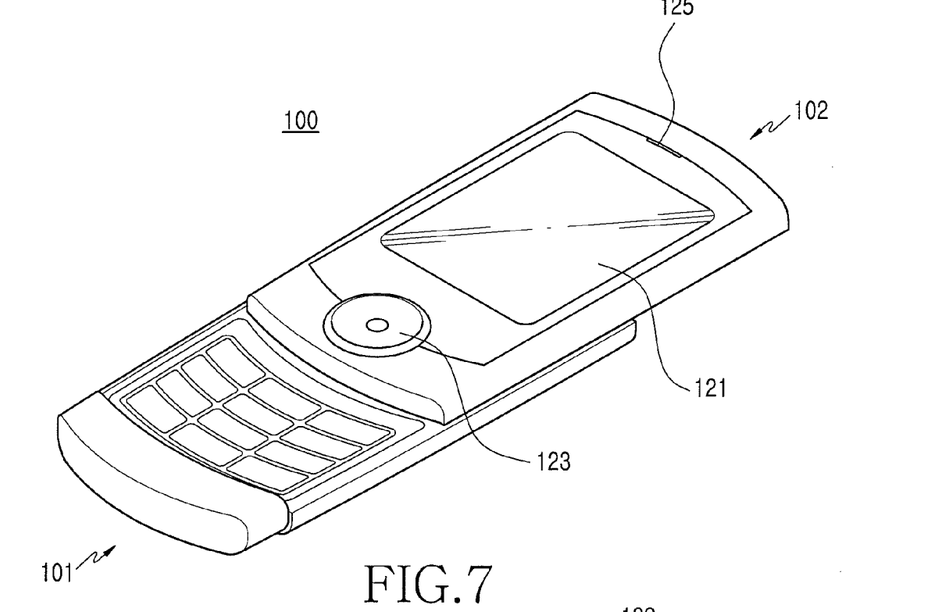
FIG. 7 is a perspective view illustrating an exemplary portable terminal shown in FIG. 5, in which a second housing has been slid.
Figure 8:
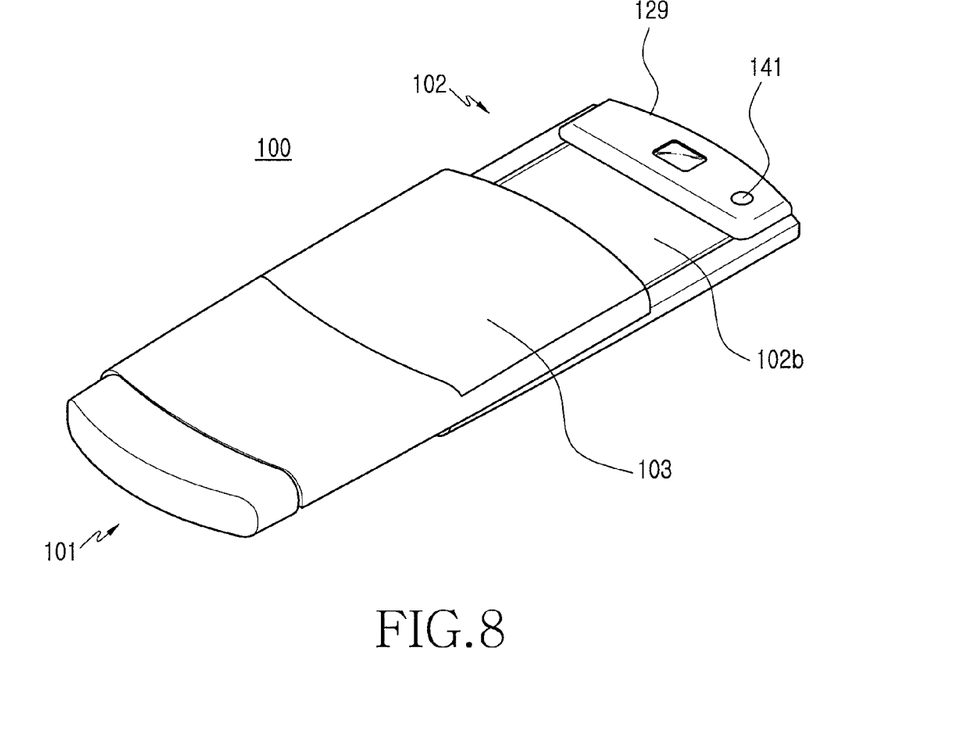
FIG. 8 is a rear perspective view illustrating an exemplary portable terminal shown in FIG. 7.

Referring to FIGS. 7 and 8, when the second housing 102 has opened the keypad 111, the camera housing 129 has escaped from the camera receiving portion 119 and is thus in the state capable of photographing. Then, the user can photograph either images or moving pictures of subjects using the terminal 100, and can perform voice calls calling a counterpart and edit and send short text messages using the keypad 111 opened.

When the keypad 111 is being opened, the elastic member 203 provides the elastic force to move the second housing 102 toward the upper side of the first housing 101 while being in the state that both ends thereof are far from each other. At the same time, the guide ribs 213 are blocked by the front case 102a, thereby restraining the second housing 102 from moving upward any more beyond the first housing 101. Therefore, the second housing 102 can be maintained in the stable stationary state while opening the keypad 111.

As described above, a sliding type portable terminal according to exemplary embodiments of the present invention can be reduced in thickness because the guide member mounted to the first housing is slidably connected to the rear case of the second housing while surrounding the rear case of the second housing. Further, the first housing is penetrated to form the space for mounting the battery pack and mounts the guide member on one face of the penetrated portion, by which the reduction of thickness of the sliding type portable terminal is more efficiently achieved.

In addition, the sliding type portable terminal according to exemplary embodiments of the present invention employs an elastic member which provides a driving force to slide the second housing. Therefore, it is convenient to use the terminal because the second housing is moved only a part of the entire sliding distance by the user and the rest of the sliding distance by the elastic force of the elastic member.

The camera module can be mounted on the camera housing formed in the second housing, by which the terminal can be provided with the camera function. Also, the camera receiving portion is formed in the first housing and then it is closed by the battery cover, thereby protecting the camera module mounted to the second housing.

Further, when the first housing is closed or partially opened, the elastic force of the elastic member acts and at the same time the stopper ribs provided to the second housing or the front case of the second housing interfere with the guide member, which in turn prevents the second housing from moving. Therefore, the second housing can be maintained in a stable stationary state. According to exemplary embodiments of the present invention, the terminal can be easily carried with the user because the first and second housing are restrained from freely moving while the first housing is being closed and can be stably manipulated by the user in order to input information for the voice call/short text message while the first housing is being opened.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A sliding type portable terminal comprising:
   a first housing;
   a second housing connected with the first housing while facing the first housing and reciprocating on the first housing in a straight direction; and
   a guide member mounted to the first housing, the guide member being slidably connected to the second housing while surrounding edges of a rear case of the second housing,
   wherein ends of at least two sides of the guide member are surrounded by a front case of the second housing.

2. The sliding type portable terminal as claimed in claim 1, further comprising an elastic member including a first end supported on the guide member and a second end supported on the rear case,
   wherein the elastic member provides an elastic force to move the first and second ends away from each other.

3. The sliding type portable terminal as claimed in claim 2, wherein the second housing reciprocately moves in the straight direction in a range from a first position at which the second housing closes one face of the first housing to a second position at which the second housing opens a part of the one face of the first housing, and
   wherein a point at which the first and second ends of the elastic member approach each other most closely exists within the range in which the second housing reciprocately moves in the straight direction.

4. The sliding type portable terminal as claimed in claim 2, wherein the elastic member comprises at least one of a torsion spring, a push rod, a compression coil spring and a zigzag wire spring, each of which have a pair of free ends extending in a direction away from each other.

5. The sliding type portable terminal as claimed in claim 1, wherein the guide member comprises:
   a connecting plate mounted to the first housing; and
   a plurality of guide ribs each mounted to a respective one of ends of both sides of the connecting plate, the plurality of guide ribs sliding on the second housing while surrounding the edges of both sides of the rear case of the second housing.

6. The sliding type portable terminal as claimed in claim 5, further comprising:
   a plurality of sliding grooves each formed on an inner side surface of a respective one of the plurality of guide ribs so that the edges of the rear case of the second housing are each slidably connected with a respective one of the plurality of sliding grooves; and
   a plurality of support ribs formed on the rear case of the second housing, each of the plurality of support ribs surrounding a part of a respective one of the plurality of guide ribs,
   wherein each of the plurality of support ribs extends in a longitudinal direction of the rear case of the second housing so that the plurality of support ribs guide the plurality of guide ribs sliding on the second housing.

7. The sliding type portable terminal as claimed in claim 1, further comprising stopper ribs formed on an upper end of the rear case of the second housing and extending outside of the rear case,
   wherein at least one of the stopper ribs and the front case of the second housing interfere with the guide members so as to limit a moving range of the second housing.

8. The sliding type portable terminal as claimed in claim 7, wherein the second housing reciprocately moves in the straight direction in a range from a first position at which the second housing closes one face of the first housing to a second position at which the second housing opens a part of the one face of the first housing, and
   wherein the front case of the second housing interferes with the guide members when the guide members are at a first position at which the second housing closes the one face of the first housing, and the stopper ribs interfere with the guide members when the guide members are at a second position at which the second housing opens the one face of the first housing.

9. The sliding type portable terminal as claimed in claim 1, further comprising:
   a camera housing formed in an upper end of the second housing, the camera housing protruding backward; and
   a camera receiving portion formed on an upper end of the first housing.

10. The sliding type portable terminal as claimed in claim 9, wherein the second housing reciprocately moves in the straight direction in a range from a first position at which the second housing closes one face of the first housing to a second position at which the second housing opens a part of the one face of the first housing, and
    wherein the camera housing is received in the camera receiving portion when the first housing is closed.

11. The sliding type portable terminal as claimed in claim 10, further comprising a battery cover removably mounted on a rear face of the first housing,
    wherein the camera housing received in the camera receiving portion is closed by the battery cover.

12. The sliding type portable terminal as claimed in claim 9, further comprising a camera module accommodated in the camera housing, the camera module including a speaker unit.

13. The sliding type portable terminal as claimed in claim 1, further comprising a battery mounting hole formed through the first housing so as to pass from a front face to a rear face of the first housing,
    wherein the battery mounting hole is closed by the guide member at the front face of the first housing.

14. The sliding type portable terminal as claimed in claim 1, further comprising:
    a battery mounting hole formed through the first housing so as to pass from a front face to a rear face of the first housing; and
    a battery cover removably mounted on the rear face of the first housing,
    wherein the battery mounting hole is closed by the battery cover at the rear face of the first housing.

15. The sliding type portable terminal as claimed in claim 14, further comprising:
    a connecting groove formed on the rear face of the first housing;
    a hook recess formed on an upper end of the first housing;
    a connecting protrusion formed on one end of the battery cover; and
    a hook formed on an inner face of the battery cover,
    wherein when the battery cover closes the battery hole, the battery cover is connected with the first housing while facing an inside surface of the first housing by such a manner that the connecting protrusion is engaged with the connecting groove and the hook is received in the hook recess.

16. The sliding type portable terminal as claimed in claim 14, further comprising:
- a pair of first connecting ribs each formed on a respective one of inner sides of walls of both sides of the battery cover; and
- at least one pair of second connecting ribs each formed on a respective one of both side surfaces of the first housing,
- wherein the battery cover is connected with the first housing while surrounding a part of both side surfaces of the first housing, and
- wherein the first connecting ribs and the second connecting ribs are connected to each other so that the battery cover is closely contacted with and secured to the first housing.

17. The sliding type portable terminal as claimed in claim 14, further comprising a camera receiving portion formed in the upper end of the first housing, the camera receiving portion being adjacent to the battery mounting hole,
- wherein a part of the camera receiving portion is closed by the battery cover.

18. The sliding type portable terminal as claimed in claim 17, further comprising a camera housing formed in an upper end of the second housing, the camera housing protruding backward,
- wherein the camera housing is selectively received in the camera receiving portion when the second housing reciprocately moves in the straight direction, and
- wherein the camera housing is closed by the battery cover when being received in the camera receiving portion.

19. A sliding type portable terminal comprising:
- a first housing;
- a second housing including a front case and a rear case; and
- a guide member
- wherein the guide member is mounted to the first housing, surrounds edges of the rear case of the second housing so as to be slidably connected to the second housing and is covered by the front case of the second housing.

20. The sliding type portable terminal as claimed in claim 19, wherein the guide member comprises:
- a connecting plate mounted to the first housing; and
- a plurality of guide ribs each mounted to a respective one of ends of both sides of the connecting plate, the plurality of guide ribs sliding on the second housing while surrounding the edges of both sides of the rear case of the second housing.

* * * * *